(12) United States Patent
Trzynadlowski et al.

(10) Patent No.: US 6,600,669 B2
(45) Date of Patent: Jul. 29, 2003

(54) RANDOM PULSE WIDTH MODULATION METHOD AND DEVICE

(75) Inventors: Andrzej M. Trzynadlowski, Reno, NV (US); Bin Huo, Framingham, MA (US)

(73) Assignee: The Board of Regents of the University and Community College System of Nevada, on behalf of the University of Nevada at Reno, Reno, NV (US)

( * ) Notice: Subject to any disclaimer, the term of this patent is extended or adjusted under 35 U.S.C. 154(b) by 0 days.

(21) Appl. No.: 10/180,432

(22) Filed: Jun. 25, 2002

(65) Prior Publication Data

US 2003/0002299 A1 Jan. 2, 2003

Related U.S. Application Data

(60) Provisional application No. 60/301,554, filed on Jun. 27, 2001.

(51) Int. Cl.[7] .............................. H02M 1/12; H02M 1/14
(52) U.S. Cl. .................................. 363/41; 363/132
(58) Field of Search .................................. 363/41, 132

(56) References Cited

U.S. PATENT DOCUMENTS

| 5,492,273 | A | * | 2/1996 | Shah | 236/44 A |
| 5,510,698 | A | * | 4/1996 | Stankovic et al. | 323/282 |
| 5,592,058 | A | * | 1/1997 | Archer et al. | 318/254 |
| 5,933,339 | A | * | 8/1999 | Duba et al. | 363/71 |
| 6,101,109 | A | * | 8/2000 | Duba et al. | 363/71 |
| 6,362,628 | B2 | * | 3/2002 | Macbeth et al. | 324/536 |
| 6,380,718 | B1 | * | 4/2002 | Davis et al. | 322/28 |

* cited by examiner

Primary Examiner—Bao Q. Vu
(74) Attorney, Agent, or Firm—Sierra Patent Group, Ltd.

(57) ABSTRACT

A system and method for executing random pulse width modulation in electronic power converters. In accordance with this invention, the sampling period of sampling cycles for pulse width modulation remains constant while the period of switching cycles are varied. The periods of switching cycles are varied using random numbers to calculate delays between the start of coincident sampling and switching cycles.

42 Claims, 8 Drawing Sheets

RANDOM PULSE WIDTH MODULATION METHOD AND DEVICE

CROSS-RELATED

This application is a utility application claiming priority to an earlier filed U.S. Provisional Application No. 60/301,554, filed Jun. 27, 2001.

BACKGROUND OF THE INVENTION

1. Field of the Invention

This invention relates to electronic power converters. More particularly, this invention relates to control of the input and output of electronic converters. Still more particularly, this invention relates to a system and apparatus for controlling electronic power converters using, random pulse width modulation.

2. The Prior Art

Electronic power converters include AC/DC converters also known as rectifiers and DC/AC converters also known as inverters. Typically, an electronic power converter is a network of semiconductor power switches. The fundamental component of output voltage of an electronic power converter is controlled by opening and closing individual switches in the network. The opening and closing of the individual switches is controlled by pulse width modulation (PWM) of switching signals applied to the individual switches. The distribution of the switching signals in time is referred to as a switching pattern. PWM may also be used to make current drawn from an AC supply source sinusoidal and in phase, with the supply voltage which maximizes utilization of the current in a rectifier. In inverters, appropriate width modulation of the switching pulses reduces the distortion of the output voltage and current.

One example of a system that uses electronic power converters controlled by PWM is an adjustable speed AC drive. Typically, an adjustable speed AC driver includes a rectifier, a DC link, an inverter and an AC motor. The rectifier converts input AC voltage from a power grid into a DC voltage. PWM or phase control may be used to control the rectifier. Alternatively, the rectifier may be uncontrolled. The DC link connects the rectifier to the inverter. The DC link is a capacitive or inductive-capacitive low-pass filter. The inverter receives the DC voltage from the DC link and converts the DC voltage to a three-phase, adjustable frequency, and adjustable magnitude AC voltage. PWM is used to control the inverter. The AC voltage is then applied to the AC motor.

In most electronic power converters controlled by PWM, the switching frequency is constant. The switching frequency is the number of switching cycles per second and per switch. In a rectifier, the switching frequency is typically two orders of magnitude higher than the input frequency. In an inverter, the switching frequency is typically two orders of magnitude higher than the output frequency. The switching cycles are also typically coincident with sampling cycles of a digital pulse width modulator controlling the converter. The coincidence of the switching and sampling cycles makes the switching frequency constant substantially equal to the sampling frequency.

Coincident cycles are a solution of convenience for makers of electronic power converters. However, coincident cycles may cause many problems. One problem with a constant switching frequency is the constant switching frequency results in clusters of higher harmonics in power spectra of voltages and currents of a converter at multiples of the frequency. These harmonics may cause undesirable side effects in systems connected to the input and outputs of the converter. For example, an adjustable speed AC drive having an inverter that is pulse width modified may have harmonic torques and forces generated in the motor that produce tonal noise and increase susceptibility of the drive to vibration.

Harmonic components of current from a power grid may cause electromagnetic interference (EMI) that is radiated into space surrounding the converter and is conducted to the grid. The EMI is concentrated in distinct narrow bands and may disrupt operations in sensitive communications equipment exposed to the EMI. These disruptions may be reduced by adding a special filter that may increase the expense and complexity of the equipment. There is a need in the art for a method of controlling an electronic power converter with PWM that reduces this and other problems.

Random Pulse Width Modulation (RPWM) techniques have been used to control electronic power converters. RPWM techniques have been described in "Random Pulse Width Modulation Techniques for Converter-Fed Drive Systems—A Review" A. M Trzynadlowski et al., *IEEE Transactions on Industry Applications*, Vol. 30, No. 5, pp. 1166–1175, 1994. An RPWM technique is characterized by random variations of the switching frequency. The random variations of the frequency alleviate undesirable components in PWM electronic power converters. Specifically, the fundamental AC component in PWM higher harmonics remains unchanged. However, the spectral power, measured in Watts, is converted to continuous power density, measured in Watts per Hertz, instead of being concentrated in the higher harmonics. The power spectra of the output voltage and current from a RPWM power converter emulate the spectrum of white noise. Consequently, spurious phenomena are significantly mitigated. Some examples of spurious phenomena mitigated include tonal acoustic noise, radiated EMI, and conducted EMI.

In most applications, a PWM converter is part of a larger control system. An example of these control systems is a digital speed or position controller of an electric drive. In order to provide PWM, a modulator connected to the converter must be provided with a reference signal of the output voltage prior to the beginning of a switching cycle in which a voltage will be generated by the power converter. This signal is typically produced by a control system in a sampling cycle preceding the switching cycle for which the signal is used. Thus, period of coincidental sampling and switching cycle are of the same length whether the sampling cycle is constant or of random length. This allows a modulator to receive signals for the reference voltage in time to compute and generate a switching pattern for the next switching cycle. It is a problem in systems having a random length of switching periods that this method requires the sampling cycle to vary by the same amount as the switching cycles. The use of identically varying sampling and switching cycles is easy to implement. However, these cycles are inferior to systems with constant sampling frequencies. A constant sampling frequency is superior because the constant frequencies represent a fixed level representing an optimal trade-off between various operating requirements. For this reason, RPWM has been a less desirable alternative for providing PWM in electrical power converters. Therefore, there is a need in the art for a system that provides the advantages of RPWM while taking advantage of constant sampling cycles.

BRIEF DESCRIPTION OF THE INVENTION

The above and other problems are solved and an advance in the art is made through a method and apparatus for random pulse width modulation of an electronic power converter in accordance with this invention. In accordance with this invention, a method for Random Pulse Width Modulation (RPWM) is provided having constant periods for sampling cycles and random periods for sampling cycles. This method of RPWM is flexible and allows shaping of the frequency spectrum of the output voltage and input current of a power converter. This shaping optimizes the mitigation of spurious side effects.

In accordance with this invention, a modulator having a processor or microprocessor executing instructions stored in memory provides a method of RPWM. Alternatively, the modulator has circuitry that performs these steps.

RPWM is provided in the following manner. The method begins by determining a switching period randomly for a switching cycle subsequent to a current sampling cycle. The method then determines a switching pattern from a reference voltage generated from sample signals detected and processed in the current sampling cycle. Switching signals are then generated to make a specific switching pattern. The switching signals are then transmitted to switches of the converter during the switching cycle.

In accordance to the method of this invention, the switching period may be determined by calculating the switching period. In one exemplary embodiment, the calculation of the period may start by generating a first random number. A first delay between the switching cycle and a coincident sampling cycle is determined by multiplying the random number by the period of the coincident sampling cycle. A second random number is generated and multiplied by the period of a sampling cycle to determine the second delay. The second delay is the delay for the switching cycle subsequent to the cycle being calculated. The period of the switching cycle is then calculated by subtracting the first delay from the period of the sampling cycle and adding the second delay to the result.

The start time of the switching cycle is then calculated by adding the first delay to the start time of the coincident sampling cycle. The switching signals are then transmitted to the converter from the start time until the calculated period expires.

Sometimes the period of the switching cycle may be too short for calculation of the switching signals. Therefore, a comparison of the calculated switching period with a specific minimum allowable value of this period may be required. This minimum allowable value is hereinafter referred to as a switching period minimum. If the calculated switching period is less than the switching period minimum, the switching period is changed to the minimum switching period. If the period is changed to the minimum switching period the delay for the subsequent switching period must be adjusted. In the exemplary embodiment, the calculation of the second delay for the subsequent switching period is completed by subtracting the sample period from the switching period and adding the first delay.

The reference voltage may be received from a control system that generates the reference voltage from sample signals received in a previous sampling cycle.

BRIEF DESCRIPTION OF THE DRAWING FIGURES

The above another features and aspects of this invention are described below and shown in the following drawings.

DETAILED DESCRIPTION OF A PREFERRED EMBODIMENT

Persons of ordinary skill in the art will realize that the following description of the present invention is illustrative only and not in any way limiting. Other embodiments of the invention will readily suggest themselves to such skilled persons having the benefit of this disclosure.

Figure 1:
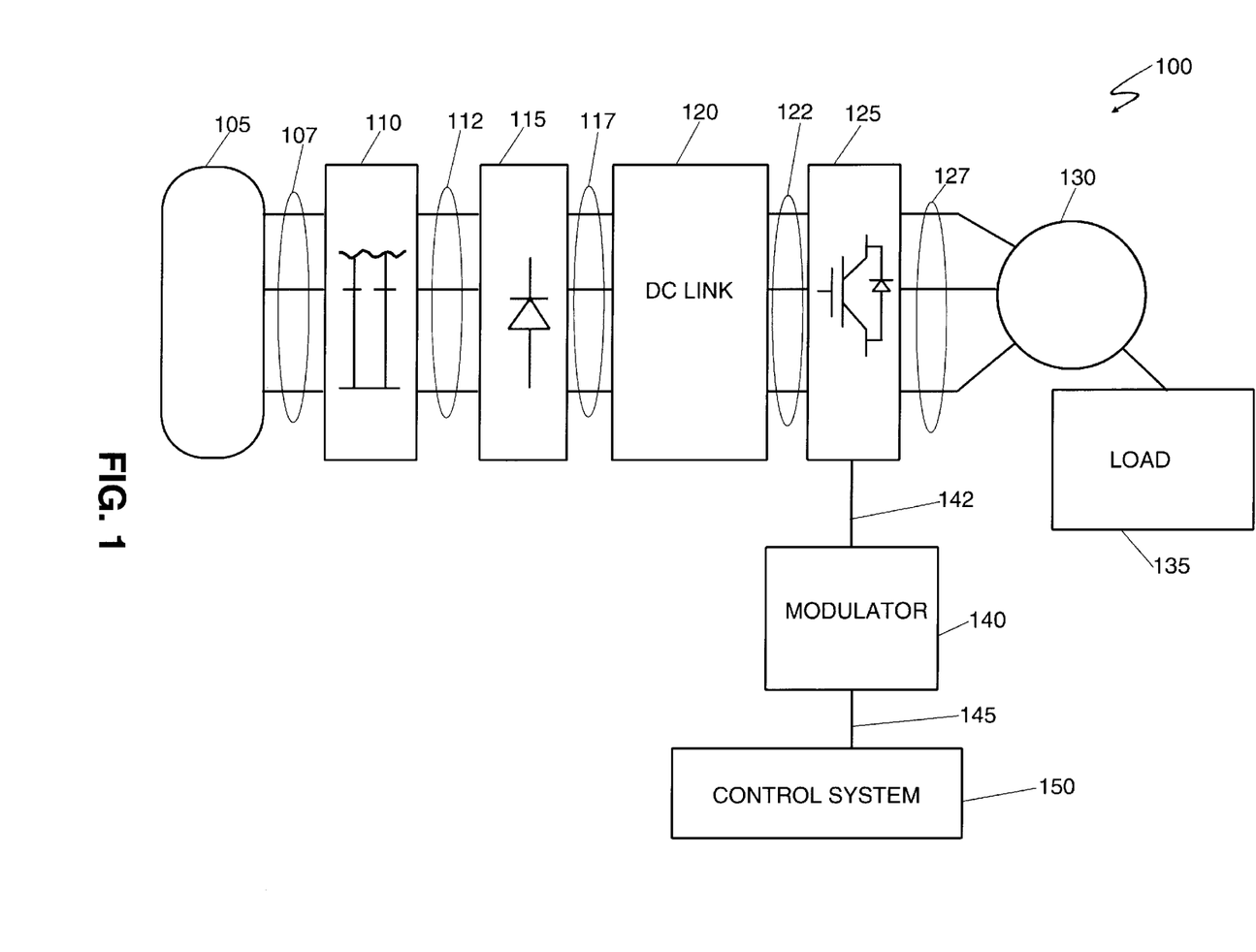
FIG. 1 illustrating a system incorporating an electric power converter and circuitry for controlling the power converter in accordance with this invention.

FIG. 1 illustrates an exemplary embodiment of an AC adjustable-speed drive 100 that implements Random Pulse Width Modulation in accordance with this invention. In drive 100, power supply 105 supplies electrical voltage for AC adjustable speed drive 100. The electrical voltage from power supply 105 is applied to EMI filter 110 via path 107. Rectifier 115 receives the voltage from filter 110 via path 112 and converts the voltage to a DC voltage. The DC voltage is then applied to a DC link 120 via path 117. DC link 120 provides the DC voltage for three-phase inverter 125 via path 122. The DC voltage is converted to an AC voltage by three-phase inverter 125 and is applied to AC motor 130 via path 127. AC motor 130 then drives load 135.

Control system 150 receives command signals via path 155 from various components of drive 100. Control system 150 generates a reference voltage from the control signals. Control system 150 then generates reference voltage signals and transmits the reference voltage signals to a modulator 140 via path 145. Modulator 140 uses the reference signals to determine a switching pattern for three-phase inverter 125 and generates switching signals applied to three-phase inverter 125 during the next switching period. The switching signals are then applied to three-phase inverter 125 via path 142 during the next switching cycle. One skilled in the art will recognize that control system 150 and modulator 140 may be different application executed by the same processor, combined circuitry on a single chip or integrated in some other way without deviating from this invention.

This invention relates to a method for providing RPWM for a power converter, such as three-phase inverter 125. In accordance with this invention, RPWM is provided with switching cycles having varying periods and sampling cycles having constant periods. One skilled in the art will recognize that this method of providing RPWM is not limited to application of three-phase inverters and may be used to provide RPWM to any type of power converters with minimal changes to the processing steps.

Figure 2:
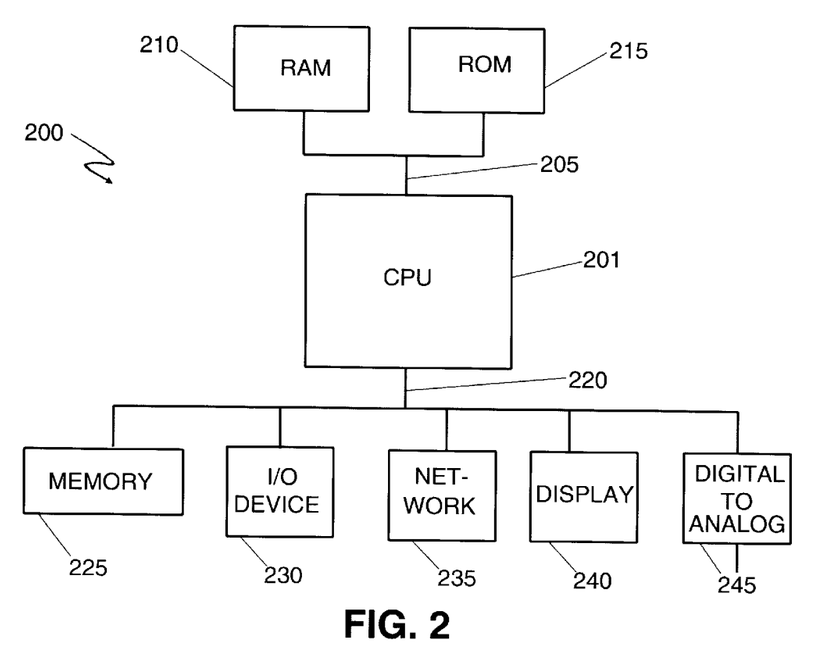
FIG. 2 illustrating a processing system that provides random pulse width modulation in accordance with this invention.

In a preferred embodiment, modulator 140 has a processing system 200 illustrated in FIG. 2. However, one skilled in the art will recognize that this invention may be implemented as well in firmware, or hard-wired circuitry. Processing system 200 has a processing unit 201. Processing unit 201 is a processor, microprocessor, or a group of processors and/or microprocessors that execute instruction stored in memory to provide applications. Processing unit is connected to a volatile and non-volatile memory via memory bus 205. A volatile memory such as Random Access Memory (RAM) 210, stores data and instructions for applications executed by processing unit 201. A non-volatile memory, such as Read Only Memory (ROM) 215, stores instructions and configuration information for processing system 100.

Input/Output (I/O) bus 220 connects processing unit 201 to peripheral device to exchange data between processing unit 201 and the devices. Examples of devices connected to processing unit 201 include memory 225, I/O device 230, network interface 235, display 240, and Digital to Analog (D/A) converter 245. Memory 225 is a drive or other device for storing instruction and data upon a media for future use. Examples of memory 225 include a magnetic tape drive and a read/write Compact Disc (CD) drive.

I/O device is a keyboard mouse or other such device that allows a user to input data. Network interface 230 connects processing system 100 to other processing devices for the communication of data. D/A converter 245 converts signals from processing unit 201 into analog signals for transmission to connected analog devices. In the preferred embodiment, processing unit 201 transmits switching signals to D/A converter 245 which converts the signals to analog signals that are transmitted to switches inside inverter 125. One skilled in the art will recognize that another type of interface may be used to connect processing system 200 to switches inside inverter 125.

Figure 3:
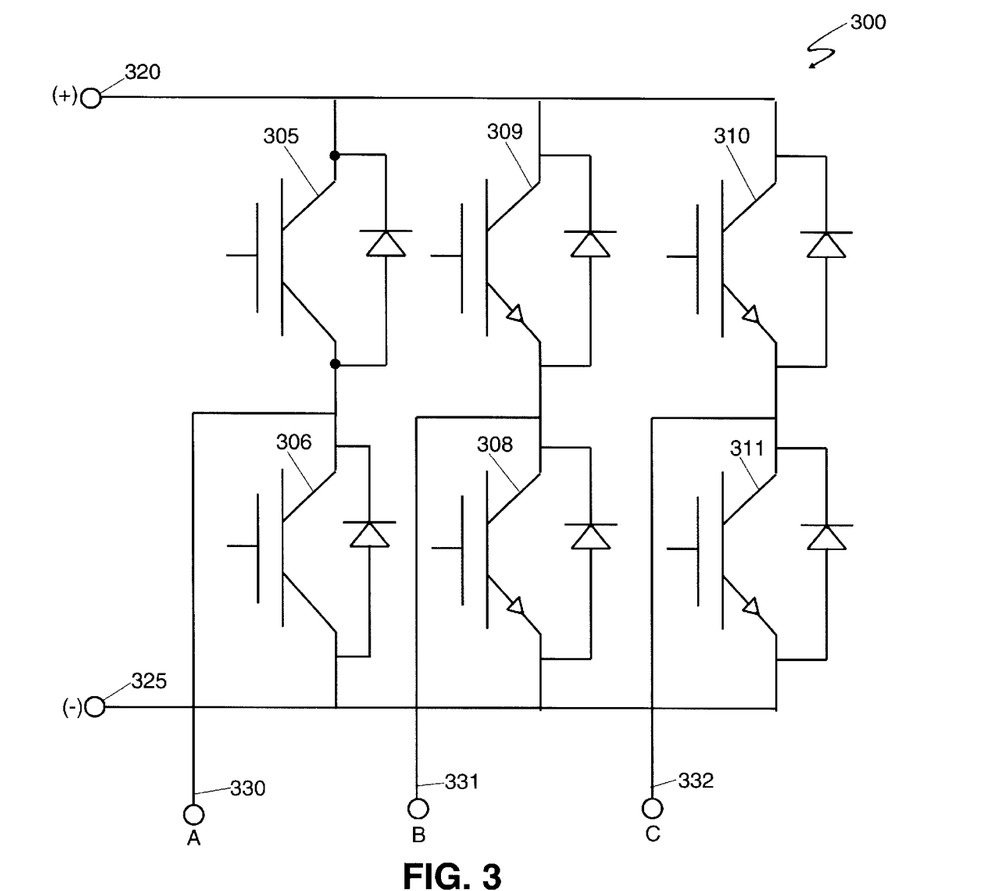
FIG. 3 illustrating an example of a switching pattern.

FIG. 3 illustrates an exemplary power circuit 300 in three-phase inverter 125. Positive input terminal 320 and negative input terminal 325 connect to DC link 120. Output terminals 330–332 connect to motor 130. Power circuit 300 includes six power conductor switches 305–311. Each switch receives switching signals via a respective path 311–316. Switches 305–311 are grouped into complementary pairs. The pairs are switches 305–306, switches 307–308, and switches 309–310. Each switch receives a complementary signal from the signal received by the complement of the switch. For example, when switch 305 receives a one or a high signal, switch 306 receives a zero or low signal. This prevents switches in the group from being simultaneously on or off. Thus, inverter 125 may be in any of eight switch configurations. One skilled in the art will recognize that the power circuit 300 may also be in a rectifier. When circuit 300 is used in a rectifier, a three-phase AC power supply is applied to terminals 330–332 and output DC appears on positive terminal 320 and negative terminal 325.

Figure 4:
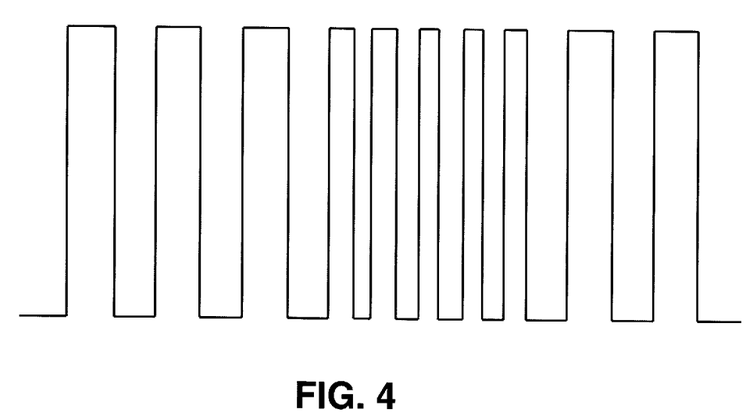
FIG. 4 illustrating an example of power circuit of a three phase inverter.

FIG. 4 illustrates a switching pattern for a switch 305–310 of inverter 125 and a single cycle output voltage of converter 125. FIG. 4 shows sinusoidal modulation of widths of the switching pulse.

Figure 5:
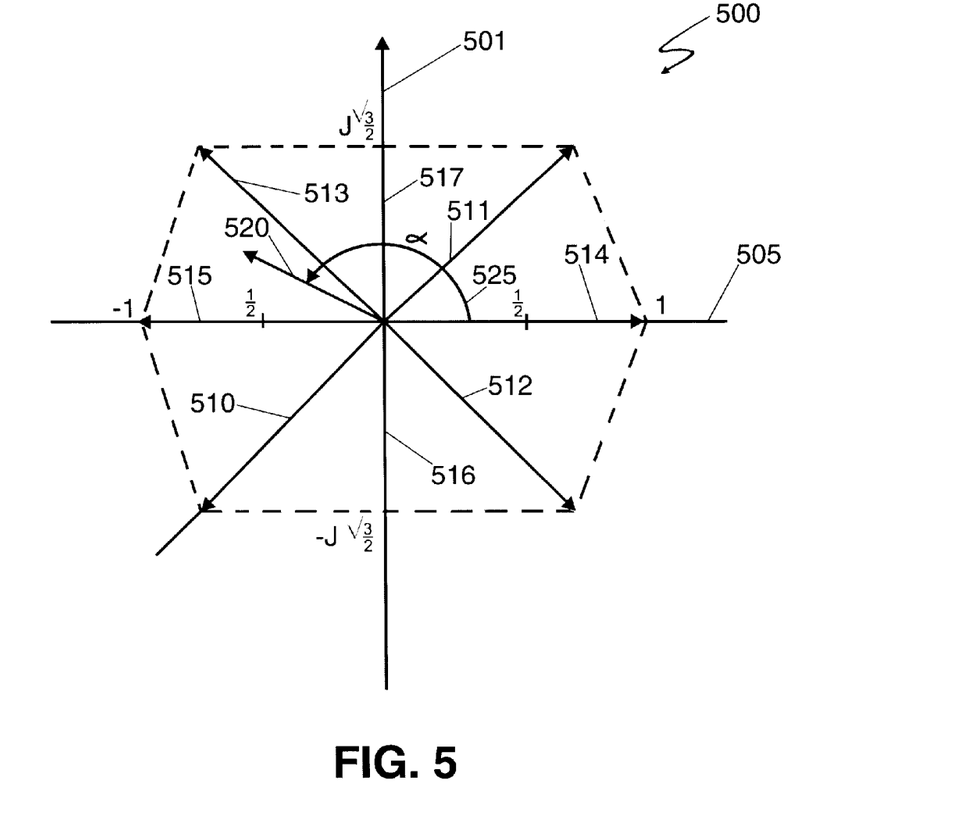
FIG. 5 illustrating a graph of voltage vectors for the three phase inverter.

In the exemplary embodiment, switching signals applied to the switches 305–310 in inverter 125 are determined in the following manner. Output voltages of inverter 125 can be expressed in a complex plane 501, 505 as shown in FIG. 5. The voltage vectors shown in FIG. 5 in a per unit format. The DC supply voltage of inverter 125 is taken a base voltage. FIG. 5 shows six vectors 510–515 of non-zero voltages. Vectors 510–515 result from six states of switches 305–310. Two other zero vectors 516, 517 result from states zero and seven. The zero vectors result in all output voltages of inverter 125 being zero.

Vector 520 is an example of a reference voltage. A coincident vector of the actual voltages 501, 505 may be synthesized as a time average of a zero vector and vectors 513, and 515 that frame vector 520. In the exemplary embodiment, a method of determining the switching pattern from the reference voltage is Space Vector Pulse Width Modulation (SVPWM). SVPWM is executed in the following manner. Compliance with the reference voltage represented by vector 520 is achieved by setting switches in inverter 125 to the state represented by vector 513, the state represented by vector 515 and the zero state represented by vector 517, each for a specific fraction of a switching cycle. The specific fraction of each state is calculated by using simple formulas involving the magnitude $|v|$ of the vector 520, and the angle $\alpha$ of vector 520, represented by arrow 525. One skilled in the art will recognize that other methods for determining the switching pattern for PWM that may be used to determine the switching pattern.

Figure 6:
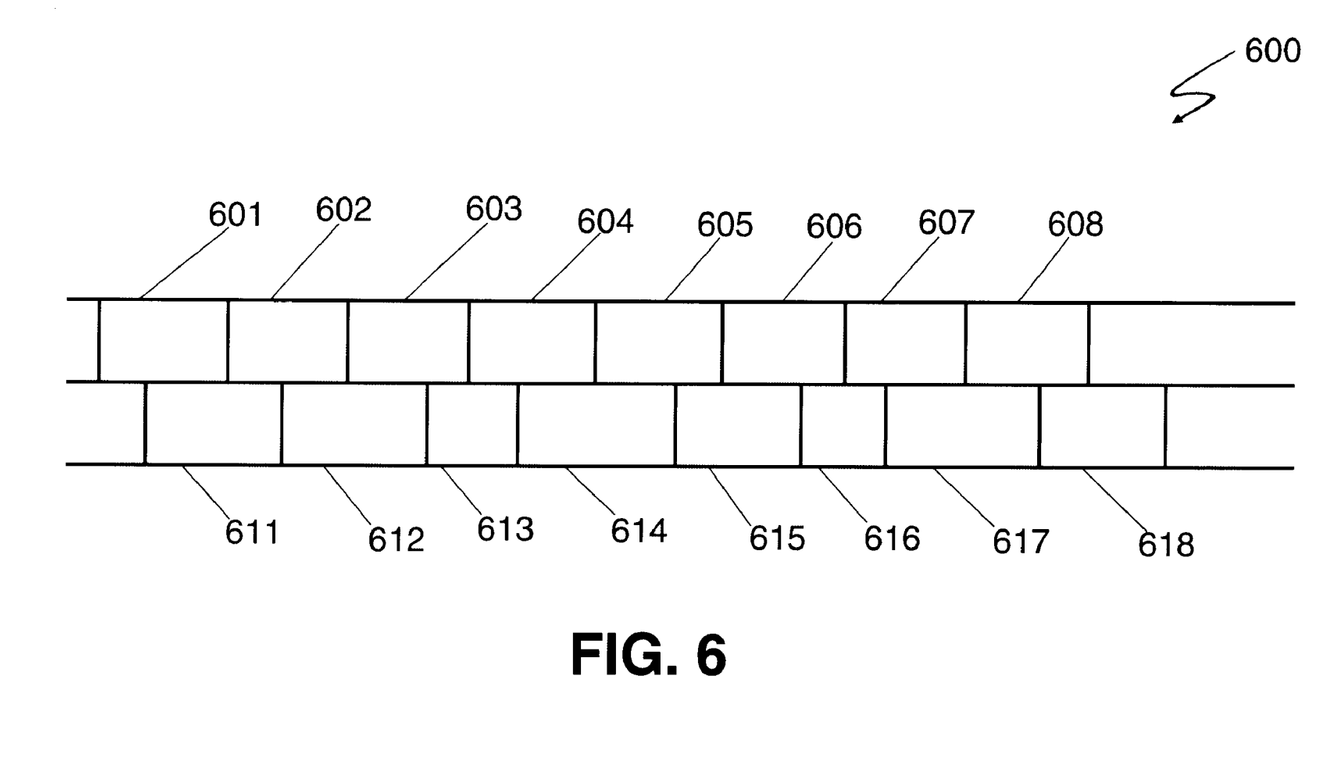
FIG. 6 illustrating a graph of randomization of switching periods.

In accordance with the present invention, RPWM is provided having sampling cycles having periods of a constant length and switching cycles having periods of random length. FIG. 6 illustrates a time diagram of sampling cycle periods compared to sampling cycles periods. In FIG. 6, the periods of sampling cycles 601–608 are all of the length, Tsample. The period of sampling cycles all vary. As shown in FIG. 6, switching periods 611, 612, 614, and 617 have periods that are greater than sampling period, Tsample. Switching periods 613 and 616 are shown to have periods that are less then sampling period Tsample. Tsample must be sufficiently long enough to calculate the switching pattern within the same cycle as the reference voltage produced. This allows the switching pattern to be determined for a switching cycle before the cycle begins. Switching periods 615 and 618 are equal to sampling period Tsample.

As can be seen in FIG. 6, each switching period 611–618 has a coincident sampling period 601–608. The start of each switching period 611–618 is delayed from the starting time of the period of the coincident sampling period. The switching signals that are applied during a switching period 611–618 are produced from a reference voltage generated in the sampling cycle 601–608 immediately prior to the coincident sampling cycle 601–608 of the switching period 611–618. For example, the switching signals applied in switching cycle 613 are generated from the reference voltage determined from signals received in sampling cycle 602. In accordance with this invention, each period of a sampling cycle must be of at least a minimal length to allow the switching pattern to be applied. One skilled in the art will recognize that the exact determination of the required length of the period will depend on factors, including but not limited to processing speed of the processor, amount of computations needed, and delay time of the switches.

Figure 7:
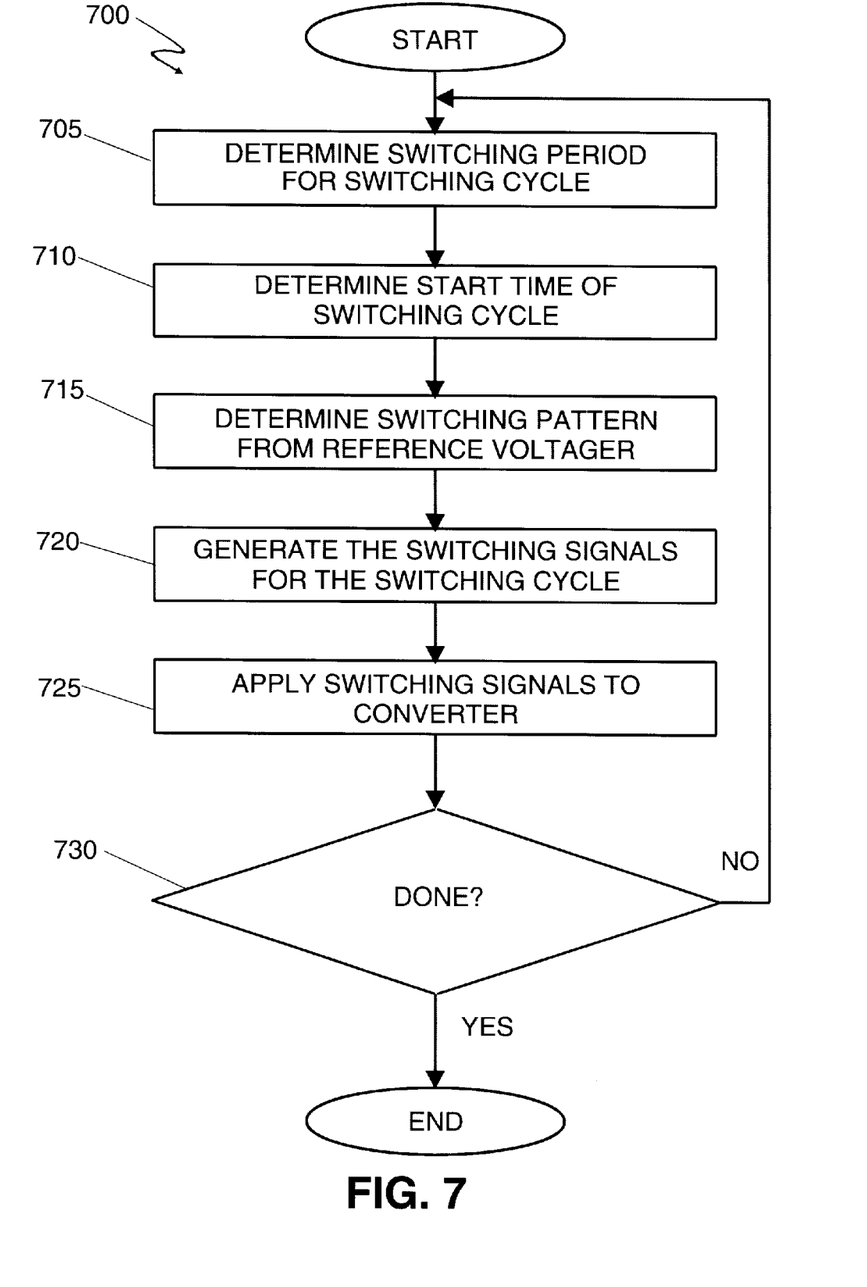
FIG. 7 illustrating a flow diagram of processing steps for providing random pulse width modulation in accordance with this invention.

FIG. 7 illustrates a flow diagram of steps executed by a processing system to provide RPWM in accordance with an exemplary embodiment of this invention. One skilled in the art will recognize that although shown in a particular order, the ordering of steps may be changed.

Figure 8:
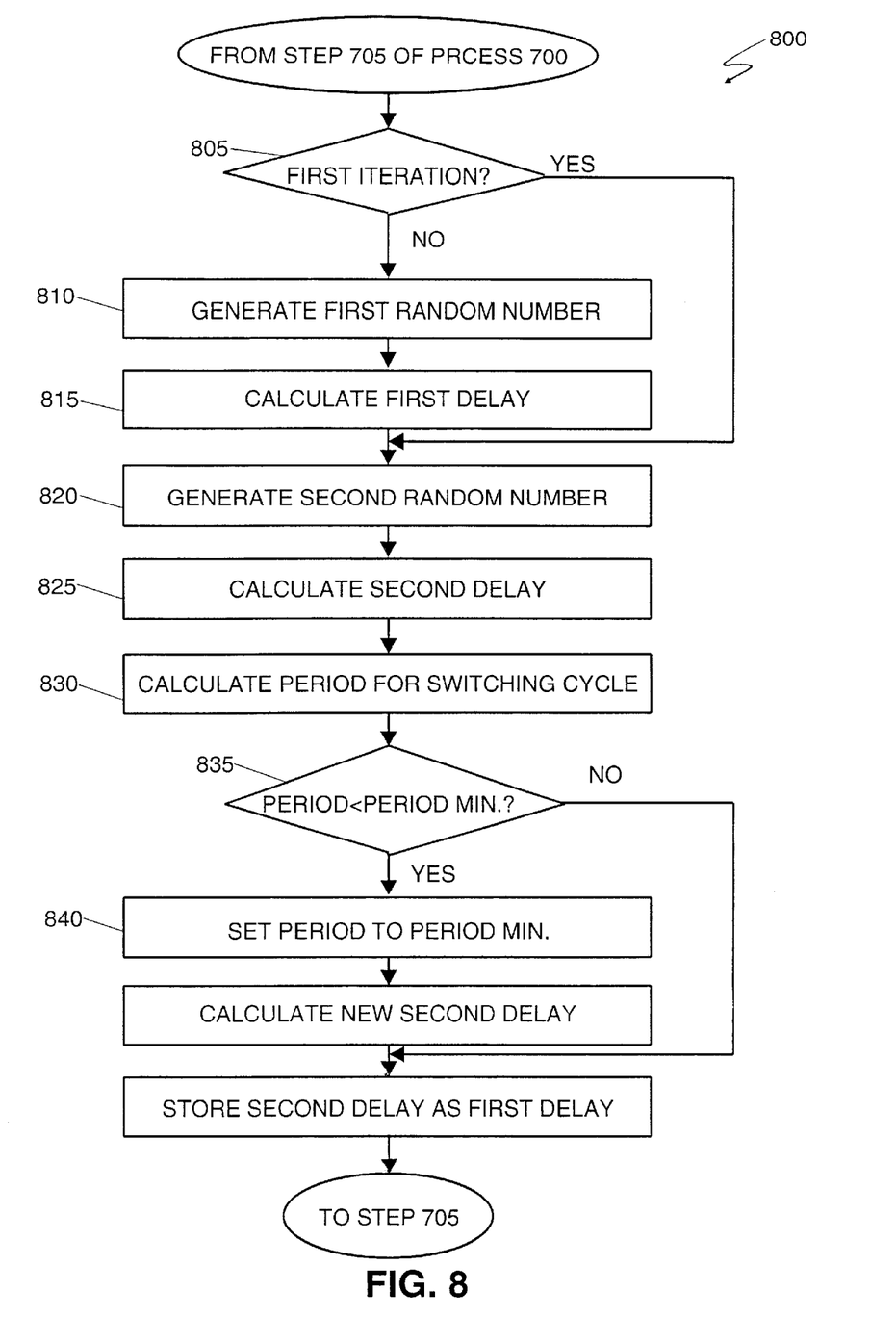
FIG. 8 illustrating a flow diagram of processing step for determining a switching period in accordance with this invention.

Process 700 begins in step 705 by determining a switching period randomly for the next switching cycle. The switching period may be randomly determined in any way that varies the length of the switching period. FIG. 8 described below is an exemplary embodiment of a process for randomly determining the switching period.

In step 710, process 700 determines the start time of the switching cycle. Typically, the start time is relative to the starting time of coincident sampling cycle. In a preferred embodiment, the start time is determined by adding a first calculated delay to the start time of a sampling cycle coincident to the switching cycle. Preferably, any switching cycle does not start before the start time of a coincident sampling cycle.

In step 715, process 700 determines the switching pattern for the switching cycle. As stated above, Space Vector Pulse Width Modulation (SVPWM) or other PWM techniques may be used to determine the switching pattern. After the switching pattern is determined, process 700 generates the switching signals to apply to switches in the power converter in step 720. The switching signals are then applied to the switches in step 725. Process 700 then determines whether another switching cycle is needed in step 730. If another switching cycle is needed, process 700 is repeated from step 705. Otherwise, process 700 ends.

As stated above, FIG. 8 illustrates a flow diagram of an exemplary embodiment of a process 800 for determining a switching period. One skilled in the art will recognize that there are many other alternatives for determining the switching period. Some examples may include but are not limited to generating a random length or progressively changing the length in a repetitive pattern.

Process 800 begins in step 805 for determining whether this is a first iteration of process 800. The determination may be completed by reading the memory storing a first delay to determine whether data is stored in the memory. If it is determined that this is a first iteration, process 800 generates a first random number in step 810. In this exemplary embodiment, the first random number is a number between 0 and 1. The first random number typically includes only one or two significant digits.

In step 820, process 800 calculates a first delay by multiplying the first random number by the period of the sampling cycle. For example, the first random number is 0.25 and the period of the sampling cycle is Tsample. Therefore, the first delay is 0.25*Tsample.

After step 820 or a determination that this is not a first iteration, process 800 generates a second random number. As stated above for the first random number, the second random number is a number between zero and one, preferably having one or two significant digits. In step 830, process 800 determines a second delay by multiplying the second random number by the period of the sampling cycle. In this exemplary embodiment, the second delay is the delay for a switching cycle subsequent to the switching cycle for which the period is being determined.

In step 835, the period for the switching cycle is calculated. In this exemplary embodiment, each switching cycle is delayed from the start time of a coincident sampling cycle. Therefore, the period of the switching cycle is the amount of time remaining in the sampling cycle after the delay and the amount of delay for the next switching period from the coincident sampling cycle of the next switching cycle. Therefore, the following equation is used to determine the period of the switching cycle:

Tswitching=(Tsample−Tdelay1)+Tdelay 2

Where:

Tswitching=period of the switching cycle;
Tsample=period of the sampling cycle;
Tdelay1=amount of first delay; and
Tdelay2=amount of second delay.

After the period of the switching cycle is determined, the period of the switching cycle is compared to a switching period minimum in step 835. The switching period minimum is the minimal amount of time in switching cycle needed to apply switching signals to the switches. One skilled in the art will recognize that the switching period minimum may be determined by various parameters including, but not limited to processor speed, signal propagation time, and switching speed. If the switching period is less than the switching period minimum, the switching period is set to the switching period minimum.

When the switching period is set to the switching period minimum, the second delay must be changed to reflect the change in the start time of the next switching cycle. In step 845, the second delay is calculated for the changed switching period. In the exemplary embodiment, the second delay is calculated by the following equation:

Tdelay2=Tswitching−(Tsample−Tdelay1) or

Tdelay2=Tswitching−Tsample+Tdelay1.

After the second delay is calculated or a determination that the switching period is greater than or equal to the switching period minimum, the second delay is stored as a first delay for the subsequent switching cycle in step 850 and process 800 ends.

Alternatively, the switching cycles may be grouped into groups of N switching cycles. In this case, a counter Y is maintained and incremented at the start of each iteration of process 800. A comparison is then made of the counter, Y, to the number N before each iteration. If Y=N, the period of the switching cycle is calculated by subtracting the first delay from the period of the sampling cycle according to the following equation:

Tswitching=Tsample−Tdelay1.

After the switching period is determined process 800 ends and returns to process 700.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A method for providing pulse width modulation of a electronic power converter comprising:

determining a switching period randomly for a switching cycle subsequent to a first sampling cycle;

determining a switching pattern from a reference voltage generated from sample signals detected in said first sampling cycle;

generating switching signals for said switching pattern; and transmitting said switching signals to switches in said electronic power converter during said switching period of said switching cycle.

2. The method of claim 1 wherein said step of determining said switching period of said switching cycle comprises:

calculating said switching period.

3. The method of claim 2 wherein said step of determining said switching period of said switching cycle further comprises:

generating a first random number; and determining a first delay between said switching cycle and a coincident sampling cycle by multiplying said first random number and a period of said sampling cycle.

4. The method of claim 3 further comprising:

determining a start time of said switching cycle by adding said delay to a start time of a sampling cycle coincident to said switching cycle.

5. The method of claim 4 wherein said switch signals are applied to said switches in said converter for said switching period from said start time of said switching period.

6. The method of claim 3 wherein said step of determining said switching period of said switching cycle further comprises:
generating a second random number; and
determining a second delay by multiplying said second random number and said period of said sampling cycle.

7. The method of claim 6 wherein said step of determining said switching period of said switching cycle comprises:
calculating said switching period by subtracting said first delay from said period of said sampling cycle and adding said second delay.

8. The method of claim 7 wherein said step of determining said switching period of said switching cycle comprises:
comparing said switching period to a switching period minimum; and
setting said switching period to said switching period minimum responsive to said switching period being less to said switching period minimum in said comparison.

9. The method of claim 8 wherein said step of determining said switching period of said switching cycle comprises:
adjusting said second delay responsive to said switching period minimum being set to said switching period minimum.

10. The method of claim 9 wherein said step of adjusting said second delay comprises the step of:
calculating said second delay by subtracting said sampling period from said switching period and adding said first delay.

11. The method of claim 1 further comprising:
determining a position of said switching cycle in a series of switching cycles.

12. The method of claim 11 further comprising:
adjusting said switching period responsive to a determination that said switching cycle is a last cycle in said series of cycles.

13. The method of claim 1 further comprising:
receiving said reference voltage.

14. The method of claim 1 further comprising:
generating said reference voltage from sample signals received during said first sampling cycle.

15. A system for controlling electronic power converters using random pulse width modulation comprising:
instructions for directing a processing unit to:
determine a switching period randomly for a switching cycle subsequent to a first sampling cycle,
determine a switching pattern from a reference voltage generated from sample signals detected in said first sampling cycle,
generate switching signals for said switching pattern, and
transmit said switching signals to switches in said electronic power converter during said switching period of said switching cycle; and
a media readable by said processing unit that stores said instructions.

16. The system of claim 15 wherein said instructions to determine said switching period of said switching cycle further include:
instructions for directing said processing unit to:
calculate said switching period.

17. The system of claim 16 wherein said instructions to determine said switching period of said switching cycle further include:
instructions for directing said processing unit to:
generate a first random number, and
determine a first delay between said switching cycle and a coincident sampling cycle by multiplying said first random number and a period of said sampling cycle.

18. The system of claim 17 wherein said instructions to determine said switching period of said switching cycle further include:
instructions for directing said processing unit to:
determine a start time of said switch cycle by adding said delay to a start time of a sampling cycle coincident to said switch cycle.

19. The system of claim 18 wherein said instructions to apply said switch signals to said switches in said converter applies said switching signals for said switching period from said start time of said switching period.

20. The system of claim 17 wherein said instructions to determine said switching period of said switching cycle further include:
instructions for directing said processing unit to:
generate a second random number; and
determine a second delay by multiplying said second random number and said period of said sampling cycle.

21. The system of claim 20 wherein said instructions to determine said switching period of said switching cycle further include:
instructions for directing said processing unit to:
calculate said switching period by subtracting said first delay from said period of said sampling cycle and adding said second delay.

22. The system of claim 21 wherein said instructions to determine said switching period of said switching cycle further include:
instructions for directing said processing unit to:
compare said switching period to a switching period minimum; and
set said switching period to said switching period minimum responsive to said switching period being less to said switching period minimum in said comparison.

23. The system of claim 22 wherein said instructions to determine said switching period of said switching cycle further include:
instructions for directing said processing unit to:
adjust said second delay responsive to said switching period minimum being set to said switching period minimum.

24. The system of claim 23 wherein instructions to adjust said second delay include:
instructions for directing said processing unit to:
calculate said second delay by subtracting said sample period from said switching period and adding said first delay.

25. The system of claim 15 wherein said instructions further include:
instructions for directing said processing unit to:
determine a position of said switching cycle in a series of switching cycles.

26. The system of claim 25 wherein said instructions further include:
instructions for directing said processing unit to:
adjust said switching period responsive to a determination that said switching cycle is a last cycle in said series of cycles.

27. The system of claim 15 wherein said instructions further include:
    instructions for directing said processing unit to:
        receive said reference voltage.

28. The system of claim 15 wherein said instructions further include:
    instructions to direct said processing unit to:
        generate said reference voltage from sample signals received during said sampling cycle.

29. An apparatus for providing pulse width modulation of an electronic power converter, comprising:
    a modulator;
    circuitry in said modulator configured to determine a switching period randomly for a switching cycle subsequent to a sampling cycle;
    circuitry in said modulator configured to determine a switching pattern from a reference voltage generated from sample signals detected in said sampling cycle;
    circuitry in said modulator configured to generate switching signals for said switching pattern; and
    circuitry in said modulator configured to transmit said switching signals to switches in said electronic power converter during said switching period of said switching cycle.

30. The apparatus of claim 29 wherein said circuitry configured to determine said switching period of said switching cycle comprises:
    circuitry configured to calculate said switching period.

31. The apparatus of claim 30 wherein said circuitry configured to determine said switching period of said switching cycle further comprises:
    circuitry configured to generate a first random number; and
    circuitry configured to determine a first delay between said switching cycle and a coincident sampling cycle by multiplying said first random number and a period of said sampling cycle.

32. The apparatus of claim 31 further comprising:
    circuitry in said modulator configured to determine a start time of said switch cycle by adding said delay to a start time of a sampling cycle coincident with said switching cycle.

33. The apparatus of claim 32 wherein said switching signals are applied to said switches in said converter for said switching period from said start time of said switching period.

34. The apparatus of claim 31 wherein said circuitry configured to determine said switching period of said switching cycle further comprises:
    circuitry configured to generate a second random number; and
    circuitry configured to determine a second delay by multiplying said second random number and said period of said sampling cycle.

35. The apparatus of claim 34 wherein said circuitry configured to determine said switching period of said switching cycle comprises:
    circuitry configured to calculate said switching period by subtracting said first delay from said period of said sampling cycle and adding said second delay.

36. The apparatus of claim 35 wherein said circuitry configured to determine said switching period of said switching cycle comprises:
    circuitry configured to compare said switching period to a switching period minimum; and
    circuitry configured to set said switching period to said switching period minimum responsive to said switching period being less to said switching period minimum in said comparison.

37. The apparatus of claim 36 wherein said circuitry configured to determine said switching period of said switching cycle comprises:
    circuitry configured to adjust said second delay responsive to said switching period minimum being set to said switching period minimum.

38. The apparatus of claim 37 wherein said circuitry configured to adjust said second delay comprises:
    circuitry configured to calculate said second delay by subtracting said sample period from said switching period and adding said first delay.

39. The apparatus of claim 29 further comprising:
    circuitry configured to determine a position of said switching cycle in a series of switching cycles.

40. The apparatus of claim 39 further comprising:
    circuitry in said modulator configured to adjust said switching period responsive to a determination that said switching cycle is a last cycle in said series of cycles.

41. The apparatus of claim 29 further comprising:
    a controller operatively coupled to said modulator;
    circuitry in said controller configured to receive said sample signal during said sampling cycle;
    circuitry in said controller configured to generate said reference voltage from said reference voltage; and
    circuitry in said controller configured to transmit said reference voltage to said modulator.

42. The apparatus of claim 41 further comprising:
    circuitry in said modulator configured to receive said reference voltage from said controller.

* * * * *